(12) United States Patent
Hong

(10) Patent No.: US 11,222,487 B2
(45) Date of Patent: Jan. 11, 2022

(54) APPARATUS AND METHOD FOR DETECTING FAULT IN IN-WHEEL DRIVING SYSTEM OF VEHICLE

(71) Applicant: HYUNDAI MOBIS CO., LTD., Seoul (KR)

(72) Inventor: Il Hwa Hong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 626 days.

(21) Appl. No.: 16/010,524

(22) Filed: Jun. 18, 2018

(65) Prior Publication Data

US 2019/0005749 A1 Jan. 3, 2019

(30) Foreign Application Priority Data

Jun. 29, 2017 (KR) ......................... 10-2017-0082264

(51) Int. Cl.
| | |
|---|---|
| *B60K 7/00* | (2006.01) |
| *B60K 17/04* | (2006.01) |
| *G07C 5/08* | (2006.01) |
| *G07C 5/02* | (2006.01) |
| *F16H 57/01* | (2012.01) |
| *B60K 17/32* | (2006.01) |

(52) U.S. Cl.
CPC .......... *G07C 5/0825* (2013.01); *B60K 7/0007* (2013.01); *B60K 17/046* (2013.01); (Continued)

(58) Field of Classification Search
CPC ...... G07C 5/0825; G07C 5/02; G07C 5/0808; G07C 5/0816; G07C 5/0841; G07C 5/0833; B60T 7/12; B60T 8/90; B60T 8/172; B60T 8/17551; B60L 15/2009; B60L 7/26; B60L 7/18; B60L 2240/461; B60L 2260/42; B60L 15/2018; B60L 2220/44; B60L 3/0061; B60L 3/12; B60L 3/0038; B60K 7/00; B60K 7/0007; B60K 7/0015; B60K 17/043; B60K 17/046; B60K 17/32; B60K 17/145; B60K 2007/003; B60K 2026/025; (Continued)

(56) References Cited

U.S. PATENT DOCUMENTS 8,706,356 B2    4/2014  Byun
9,768,714 B2 *  9/2017  Allan .................. B60L 2220/42
(Continued)

FOREIGN PATENT DOCUMENTS

CN    103879275        6/2014
CN    103879275 A  *   6/2014
(Continued)

*Primary Examiner* — Christian Chace
*Assistant Examiner* — Shayne M. Gilbertson
(74) *Attorney, Agent, or Firm* — H.C. Park & Associates, PLC

(57) ABSTRACT

An apparatus for detecting a fault in an in-wheel driving system of a vehicle including: an in-wheel motor; at least one speed reduction part coupled to the in-wheel motor through a gear and transferring a rotation force of the in-wheel motor to a wheel; a sensor part sensing rpms of the in-wheel motor and the speed reduction part; and a control unit suitable for calculating an rpm ratio between the in-wheel motor and the speed reduction part by using the respective rpms sensed through the sensor parts and determining whether a damage or a fault has occurred in the speed reduction part, based on the calculated rpm ratio.

5 Claims, 5 Drawing Sheets

(52) U.S. Cl.
CPC .............. *B60K 17/32* (2013.01); *F16H 57/01*
(2013.01); *G07C 5/02* (2013.01); *G07C*
*5/0833* (2013.01); *F16H 2057/018* (2013.01);
*G07C 5/0808* (2013.01)

(58) Field of Classification Search
CPC ...... B60K 2007/0069; B60W 60/0018; B60W
10/10; B60W 10/08; B60W 20/50; B60W
20/0205; B60W 2510/082; B60W
2510/081; B60W 50/02; B60W 50/023;
F16D 2065/1384; F16H 57/01; F16H
2057/012; F16H 2057/018; G05D 1/0072;
Y10T 74/111; B60R 16/0232
USPC .......................................... 701/32.9, 70, 72
See application file for complete search history.

(56) References Cited

U.S. PATENT DOCUMENTS

| | | | | |
|---|---|---|---|---|
| 2002/0111732 | A1* | 8/2002 | Jager | ....................... F16D 48/06 |
| | | | | 701/62 |
| 2013/0325239 | A1* | 12/2013 | Ozaki | ................... B60K 7/0007 |
| | | | | 701/22 |
| 2013/0345917 | A1* | 12/2013 | Ozaki | ................... B60K 7/0007 |
| | | | | 701/22 |
| 2017/0015213 | A1* | 1/2017 | Terada | ................. B60K 7/0007 |
| 2017/0144652 | A1* | 5/2017 | Hokoi | ................... B60W 20/50 |
| 2018/0345796 | A1* | 12/2018 | Kanda | ..................... B60L 3/102 |

FOREIGN PATENT DOCUMENTS

| | | | |
|---|---|---|---|
| CN | 106644460 | 5/2017 | |
| JP | 2000321295 A * | 11/2000 | |
| JP | 4433939 B2 * | 3/2010 | ............... B60L 3/00 |
| JP | 2012092975 | 5/2012 | |
| KR | 20110041036 | 4/2011 | |
| KR | 10-1473587 | 12/2014 | |
| KR | 201500442307 | 4/2015 | |
| KR | 20180069972 A * | 6/2018 | ............... B60K 7/00 |
| RU | 2527673 C2 * | 9/2014 | ............ G01M 13/04 |

\* cited by examiner

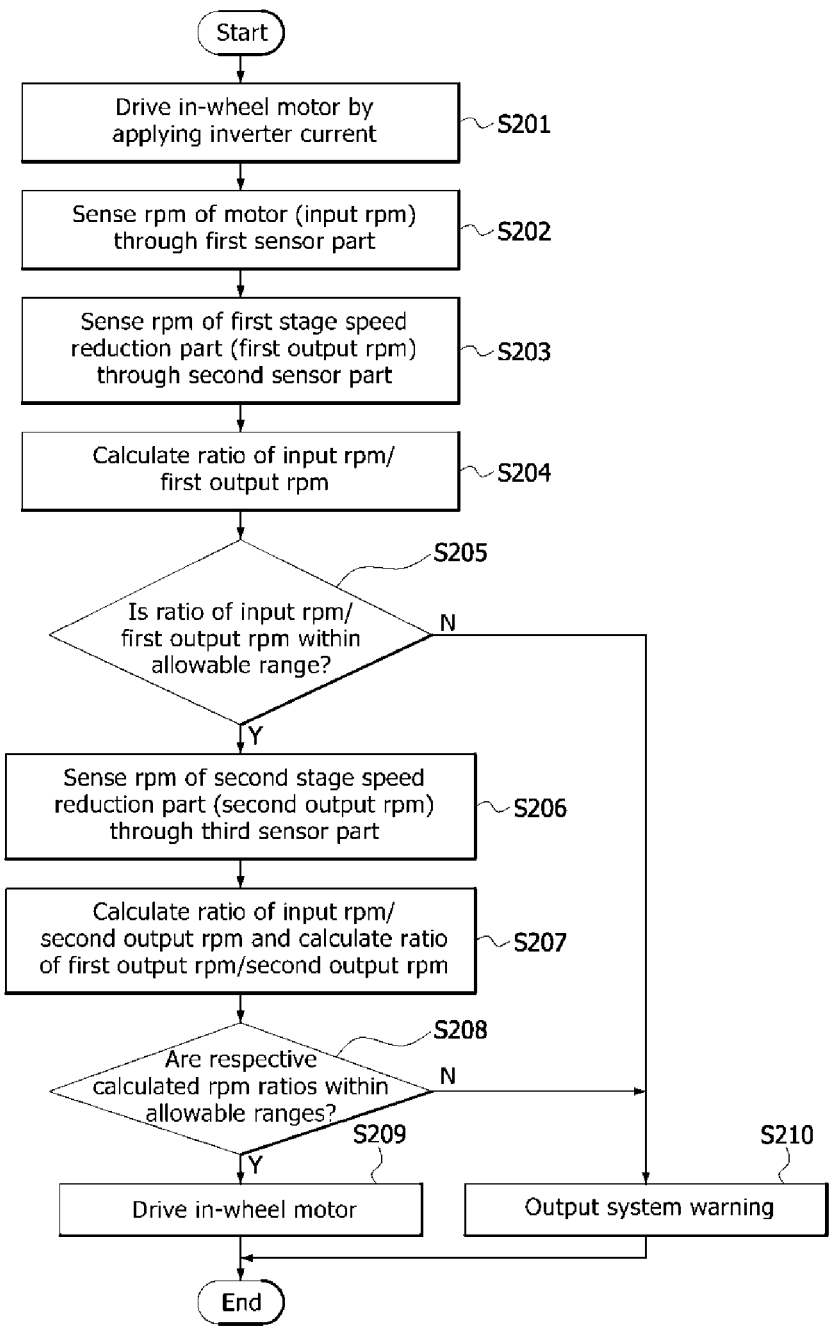

APPARATUS AND METHOD FOR DETECTING FAULT IN IN-WHEEL DRIVING SYSTEM OF VEHICLE

CROSS-REFERENCE TO RELATED APPLICATION

This application claims priority from and the benefit of Korean Patent Application No. 10-2017-0082264, filed on Jun. 29, 2017, which is hereby incorporated by reference for all purposes as if set forth herein.

BACKGROUND

Field

Exemplary embodiments of the present disclosure relate to an apparatus and a method for detecting a fault in an in-wheel driving system of a vehicle, and more particularly, to an apparatus and a method for detecting a fault in an in-wheel driving system of a vehicle, capable of detecting a fault or a damage likely to occur in a driving force transfer element of the in-wheel motor of an in-wheel driving system applied to a vehicle and thereby outputting a warning.

Discussion of the Background

In general, an in-wheel driving system (or an in-wheel motor driving system) is a system which drives a vehicle using an in-wheel motor.

The in-wheel motor is one scheme of disposing a driving system in an electric vehicle (EV). In an existing electric vehicle, a motor is equipped in such a type as to replace the engine of an existing engine vehicle. However, in a recent in-wheel motor driving scheme, motors are disposed in close proximity to drive wheels (that is, wheels), respectively, and directly drive the wheels.

Such an in-wheel motor driving scheme provides an advantage in that, because, in addition to good responsiveness to a driver's manipulation of an accelerator, it is possible to independently control left and right wheels (i.e., wheels), the behavior of a vehicle may be made more freely when making cornering by manipulating a steering wheel.

Nevertheless, in spite of such an advantage, in the in-wheel motor driving scheme, high durability of a motor speed reducer is required because an impact from a roadway is directly transferred to the body of a motor. That is to say, there is a disadvantage that the possibility of a fault to occur in the motor speed reducer increases by an impact from a roadway.

The background art of the present disclosure is disclosed in Korean Patent No. 10-1473587 (registered on Dec. 10, 2014 and entitled 'In-wheel driving system of vehicle').

The above information disclosed in this Background section is only for enhancement of understanding of the background of the invention and, therefore, it may contain information that does not constitute prior art.

SUMMARY

Exemplary embodiments of the present invention are directed to an apparatus and a method for detecting a fault in an in-wheel driving system of a vehicle, capable of detecting a fault or a damage likely to occur in a driving force transfer element of the in-wheel motor of an in-wheel driving system applied to a vehicle and thereby outputting a warning.

In an embodiment, an apparatus for detecting a fault in an in-wheel driving system of a vehicle may include: an in-wheel motor; at least one speed reduction part coupled to the in-wheel motor through a gear and transferring a rotation force of the in-wheel motor to a wheel; a sensor part sensing rpms of the in-wheel motor and the speed reduction part; and a control unit suitable for calculating an rpm ratio between the in-wheel motor and the speed reduction part by using the respective rpms sensed through the sensor parts and determining whether a damage or a fault has occurred in the speed reduction part, based on the calculated rpm ratio.

The speed reduction part includes a first stage speed reduction part primarily reducing rotation of the in-wheel motor to a predetermined speed reduction gear ratio; and a second stage speed reduction part secondarily reducing rotation of the first stage speed reduction part to a predetermined speed reduction gear ratio.

The sensor part includes a first sensor part detecting the rpm of the in-wheel motor as an input rpm to the speed reduction part; a second sensor part detecting an rpm of the first stage speed reduction part of the speed reduction part as a first output rpm; and a third sensor part detecting an rpm of the second stage speed reduction part of the speed reduction part as a second output rpm.

The sensor part includes at least one among a wheel speed sensor, an encoder, a resolver and an angle sensor.

The control unit calculates, based on the rpms detected through the sensor part, a ratio of the input rpm and the first output rpm, a ratio of the input rpm and the second output rpm and a ratio of the first output rpm and the second output rpm, and the control unit determines a damage or a fault of the speed reduction part according to whether the respective calculated rpm ratios are within allowable ranges.

In order to determine whether a damage or a fault has occurred in the speed reduction part, the control unit calculates reference rpms based on already known speed reduction gear ratios between the in-wheel motor and the speed reduction part, and sets the allowable ranges in consideration of errors of the sensor part with respect to the reference rpms.

The apparatus further includes a warning output part warning that an abnormality has occurred in the in-wheel driving system, through AVN (audio, video, navigation) in the vehicle, wherein, when a damage or a fault has occurred in the speed reduction part, the warning output part warns that an abnormality has occurred in the in-wheel driving system, according to control of the control unit.

The control unit determines a state of the in-wheel driving system in real time or cyclically while the vehicle runs or in a test mode before the vehicle runs, and, when it is determined that a damage or a fault has occurred, the control unit outputs a warning or controls the in-wheel motor not to be driven.

In an embodiment, a method for detecting a fault in an in-wheel driving system of a vehicle, including at least one speed reduction part which is coupled to an in-wheel motor through a gear and transfers a rotation force of the in-wheel motor to a wheel, may include: sensing respective rpms of the in-wheel motor and the at least one speed reduction part by using a sensor part by a control unit; calculating at least one predetermined rpm ratio between the in-wheel motor and the speed reduction part by using the respective sensed rpms by the control unit; and determining, by the control unit, whether a damage or a fault has occurred between the in-wheel motor and the speed reduction part, based on the calculated at least one rpm ratio.

In the sensing of the respective rpms of the in-wheel motor and the at least one speed reduction part, the control unit detects the rpm of the in-wheel motor as an input rpm to the speed reduction part, detects an rpm of a first stage speed reduction part of the speed reduction part as a first output rpm and detects an rpm of a second stage speed reduction part of the speed reduction part as a second output rpm.

In the calculating of the at least one predetermined rpm ratio between the in-wheel motor and the speed reduction part, the control unit calculates, based on the rpms detected through the sensor part, a ratio of the input rpm and the first output rpm, a ratio of the input rpm and the second output rpm and a ratio of the first output rpm and the second output rpm.

In the determining of whether a damage or a fault has occurred between the in-wheel motor and the speed reduction part, based on the calculated at least one rpm ratio, the control unit calculates reference rpms based on already known speed reduction gear ratios between the in-wheel motor and the speed reduction part, sets allowable ranges in consideration of errors of the sensor part with respect to the reference rpms, and determines whether a damage or a fault has occurred between the in-wheel motor and the speed reduction part, according to whether the respective calculated rpm ratios are within the allowable ranges.

The method further includes outputting a warning through a warning output part or controlling the in-wheel motor not to be driven, by the control unit, in the case where it is determined that a damage or a fault has occurred, in the determining whether a damage or a fault has occurred between the in-wheel motor and the speed reduction part.

According to the embodiments, it is possible to detect a fault or a damage likely to occur in a driving force transfer element of the in-wheel motor of an in-wheel driving system applied to a vehicle and thereby output a warning.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a flow chart to assist in the explanation of a method for detecting a fault in an in-wheel driving system of a vehicle in accordance with an embodiment of the present disclosure.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, an apparatus and a method for detecting a fault in an in-wheel driving system of a vehicle will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 1:
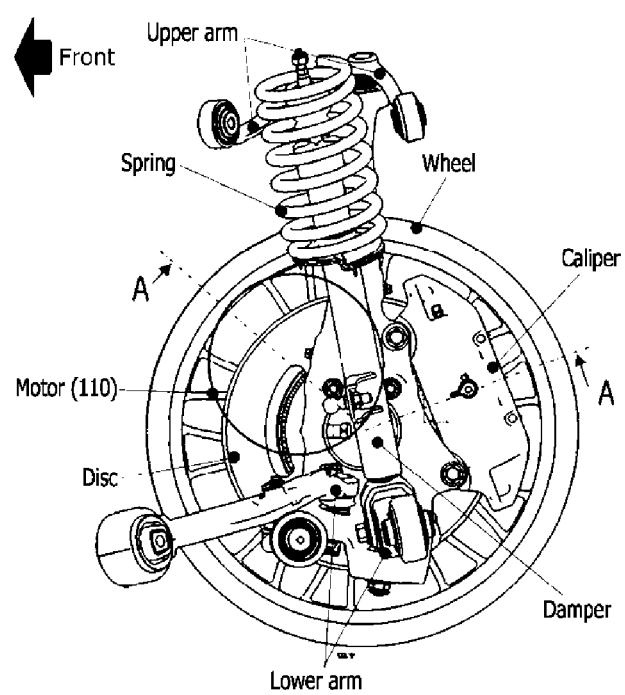
FIG. 1 is an exemplary view schematically illustrating the inside shape of a wheel to assist in the explanation of a position where an in-wheel motor related with an embodiment of the present disclosure is attached.

FIG. 1 is an exemplary view schematically illustrating the inside shape of a wheel to assist in the explanation of a position where an in-wheel motor related with an embodiment of the present disclosure is attached.

As shown in FIG. 1, an in-wheel motor 110 is attached to the upper front portion of the inside of a wheel to maximize the size of the in-wheel motor 110 while avoiding interference with a chassis component during rotation of the wheel.

Due to this fact, the degree of freedom for disposing a suspension such as a tie rod and a lower arm below the in-wheel motor 110 increases, and a brake caliper may be easily received on an outside opposite to the inside of the wheel on which in-wheel motor 110 is attached.

Therefore, in an in-wheel driving system related with the embodiment of the present disclosure, when viewed from the inside toward the outside of a vehicle, as shown in FIG. 1, the center of the in-wheel motor 110 is positioned at a predetermined distance forwardly of and above the center of an axle, the brake caliper is positioned rearwardly of and above the center of the axle, a strut mounting part is positioned above the center of the axle, and a lower arm mounting part and a tie rod are positioned below the center of the axle.

For reference, the in-wheel motor (or motor) 110 includes a stator core, a stator coil and a rotor. In the case where the motor 110 is a three-phase motor, the stator coil (not shown) may include a U-shaped coil, a V-shaped coil and a W-shaped coil, and the rotor is disposed on the inner circumferential sides of the stator core and the stator coil and is rotatably supported by a bearing (not shown) and a motor cover (not shown). Meanwhile, a resolver (a kind of sensor for measuring the position of the motor rotor) is mounted behind the bearing to allow a control unit (see the reference numeral 130 of FIG. 2) to detect an input rpm (that is, a motor rpm inputted to a speed reduction part) based on a position information for motor control.

Figure 2:
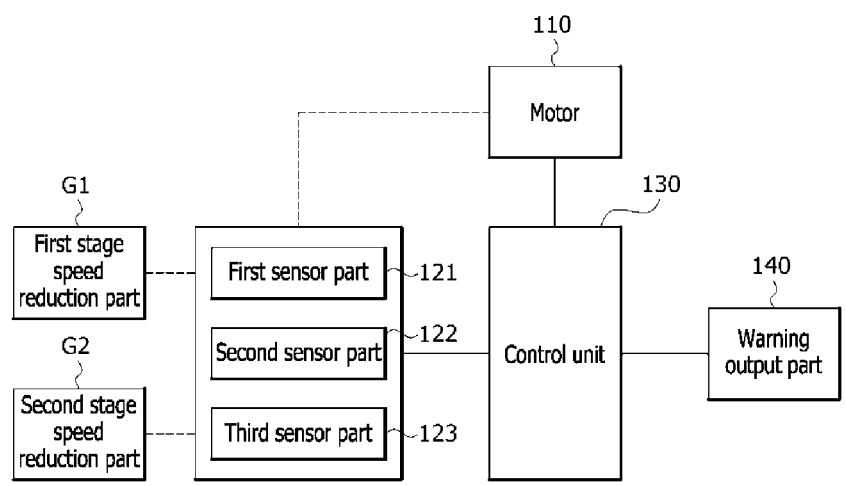
FIG. 2 is an exemplary view illustrating the schematic construction of an apparatus for detecting a fault in an in-wheel driving system of a vehicle in accordance with an embodiment of the present disclosure.

The rotation output of the rotor is transferred to the wheel via one or more speed reduction mechanisms (e.g.: a first stage speed reduction part and a second stage speed reduction part) G1 and G2 (see FIG. 2). The speed reduction mechanisms G1 and G2 may use speed reduction gears such as planetary gears and counter gears, and it is possible to realize one or more stage speed reduction. In the present embodiment, it will be exemplarily described that multi-stage speed reduction mechanisms of the first stage speed reduction part G1 and the second stage speed reduction part G2 are applied.

FIG. 2 is an exemplary view illustrating the schematic construction of an apparatus for detecting a fault in an in-wheel driving system of a vehicle in accordance with an embodiment of the present disclosure.

As shown in FIG. 2, the apparatus for detecting a fault in an in-wheel driving system of a vehicle in accordance with the present embodiment includes sensor parts 121, 122 and 123 which detect rpms of a motor 110, a first stage speed reduction part G1 and a second stage speed reduction part G2, respectively, a control unit 130 which calculates ratios based on the rpms detected through the sensor parts 121, 122 and 123, respectively, and determines whether a fault has occurred in the in-wheel driving system, based on the calculated rpm ratios, and a warning output part 140 which outputs a warning when a fault has occurred in the in-wheel driving system, according to control of the control unit 130.

The first stage speed reduction part G1 is a speed reduction mechanism (e.g.: a gear) which primarily reduces the rotation speed of the motor 110, and the second stage speed reduction part G2 is a speed reduction mechanism (e.g.: a gear) which secondarily reduces the rotation speed of the first stage speed reduction part G1.

Figure 3:
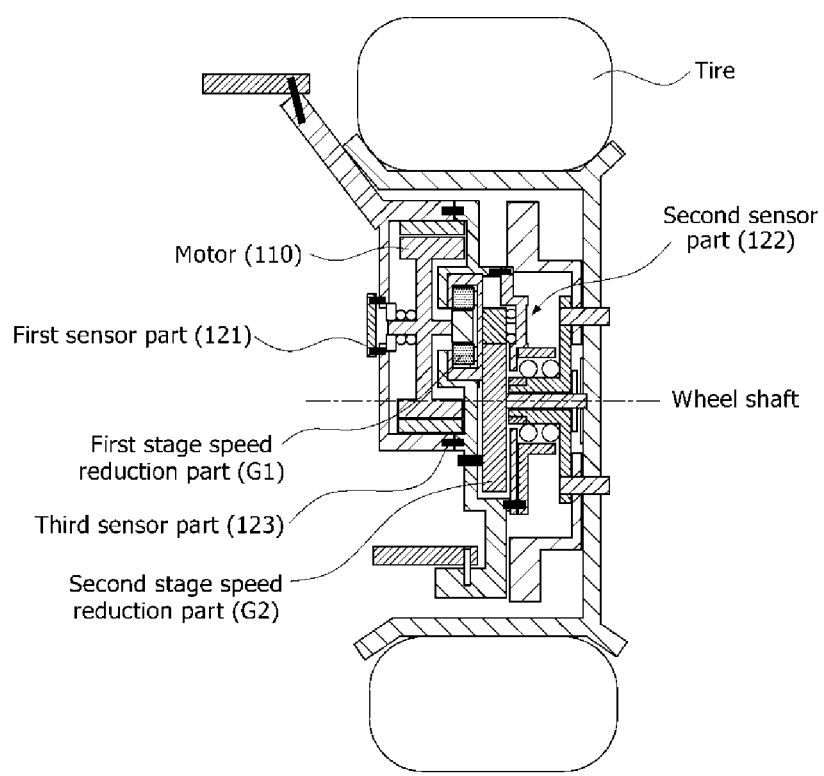
FIG. 3 is an exemplary view schematically illustrating the cross-section of the wheel to assist in the explanation of attachment positions of the sensor parts in FIG. 2.

The sensor parts 121, 122 and 123 include a first sensor part 121 which detects the rpm of the motor 110 (an input rpm at which a driving force is inputted to the first stage speed reduction part G1), a second sensor part 122 which detects the rpm (first output rpm) of the first stage speed reduction part G1, and a third sensor part 123 which detects the rpm (second output rpm) of the second stage speed reduction part G2 (see FIG. 3).

FIG. 3 is an exemplary view schematically illustrating the cross-section of the wheel to assist in the explanation of attachment positions of the sensor parts 121, 122 and 123 in FIG. 2.

As illustrated in FIG. 3, the first and second stage speed reduction parts (e.g.: a planetary gear set) G1 and G2 are disposed more outside than the motor 110. The planetary gear set is disposed on the more outer side of the vehicle than the motor 110 in a tire/wheel assembly. The planetary gear set is disposed on the same axis as the center of the motor 110, and includes a sun gear, a planetary gear, a planetary carrier and a ring gear.

For example, the sensor parts 121, 122 and 123 include one or more among a wheel speed sensor, an encoder, a resolver and an angle sensor.

The sensor parts 121, 122 and 123 may be coaxially attached to the respective rotation shafts of the motor 110, the first stage speed reduction part G1 and the second stage speed reduction part G2, and may detect the respective rpms thereof. However, in the case where such a construction of the sensor parts 121, 122 and 123 is difficult, it is also possible to construct the sensor parts 121, 122 and 123 to indirectly detect rpms by utilizing mechanisms capable of offsetting in a radial direction and an axial direction about the rotation shafts. For example, although not shown in the drawing, it is possible to detect rpms using rotation shaft offset transmission mechanisms such as gears or belts.

The control unit 130 calculates the ratio of the input rpm/the first output rpm, calculates the ratio of the input rpm/the second output rpm and calculates the ratio of the first output rpm/the second output rpm, based on the rpms detected through the sensor parts 121, 122 and 123.

When assuming that the control unit 130 already knows the speed reduction gear ratios between the motor 110 and the first stage speed reduction part G1 and between the first stage speed reduction part G1 and the second stage speed reduction part G2, the normal rpms (or reference rpms) of the first stage speed reduction part G1 and the second stage speed reduction part G2 corresponding to the rpm of the motor 110 may be calculated.

In the case where a damage or a fault has not occurred in the first stage speed reduction part G1 and the second stage speed reduction part G2, the respective rpm ratios (e.g.: the ratio of the input rpm/the first output rpm, the ratio of the input rpm/the second output rpm and the ratio of the first output rpm/the second output rpm) calculated based on the rpms detected through the sensor parts 121, 122 and 123 should be within allowable ranges (rpm ranges in consideration of errors of the sensor parts 121, 122 and 123 with respect to the reference rpms).

In the case where the respective rpm ratios (e.g.: the ratio of the input rpm/the first output rpm, the ratio of the input rpm/the second output rpm and the ratio of the first output rpm/the second output rpm) deviate from the allowable ranges (rpm ranges in consideration of errors of the sensor parts 121, 122 and 123 with respect to the reference rpms), the control unit 130 outputs a system warning through the warning output part 140.

The warning output part 140 warns that an abnormality has occurred in the in-wheel driving system, through AVN (audio, video, navigation) in the vehicle.

Thus, as a driver may actively cope with the abnormality of the in-wheel driving system, safety may be improved.

For example, the control unit 130 may determine that an abnormality has occurred in the in-wheel driving system, in the case where there is a difference equal to or larger than an allowance (an allowance in consideration of errors of the sensor parts 121, 122 and 123) by considering the already known speed reduction ratios with respect to the rpm ratios (or rpms).

In the case where it is determined that an abnormality has occurred in the in-wheel driving system, it may be determined that an element which may be estimated as having an abnormality is the first stage speed reduction part G1 or a further speed reduction mechanism (e.g.: the second stage speed reduction part G2), and, based on a determined information, it is possible to warn the driver of the abnormality of the in-wheel driving system. For instance, in a fault or an abnormality mode of the in-wheel driving system, the control unit 130 may cause a driver's active handling through a sudden braking alarm or guiding a vehicle step, whereby it is possible to prevent an accident.

In particular, since a wheel lock phenomenon due to a fault in the in-wheel driving system may lead to a very dangerous situation to the driver, the control unit 130 may determine the state of the in-wheel driving system in real time or with a predetermined cycle and may warn the driver of a danger in a danger mode in which it is determined that a fault or an abnormality has occurred, thereby securing safety.

Hereafter, the detailed operations of the control unit 130 will be described with reference to FIGS. 4 and 5.

Figure 4:
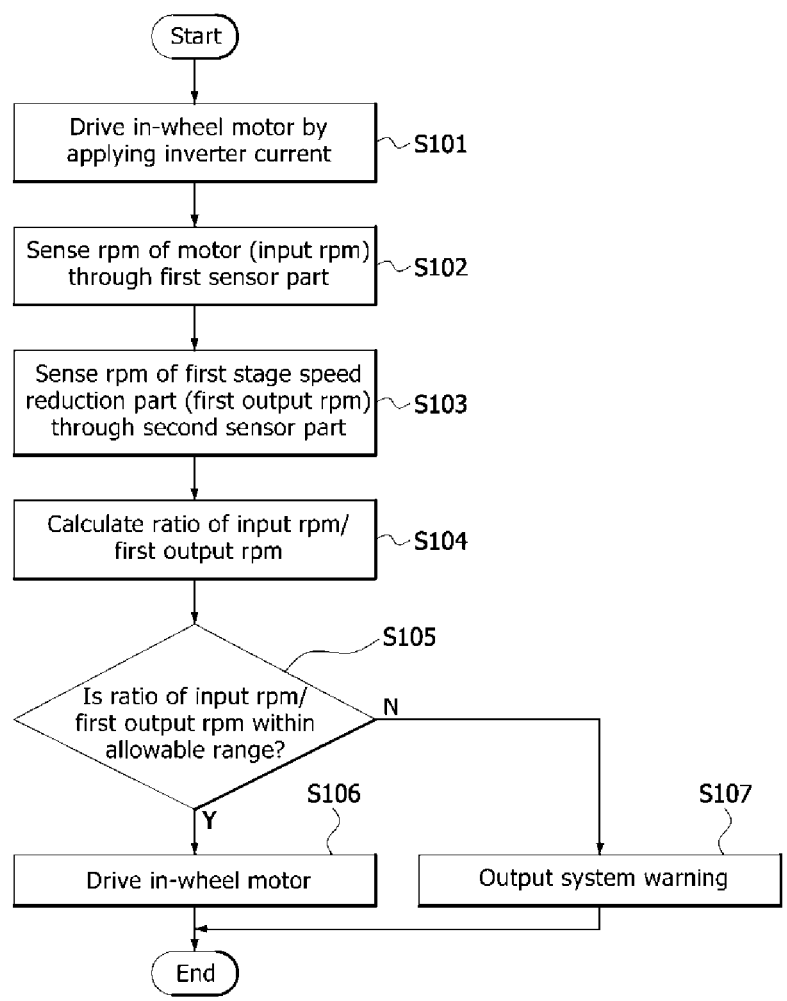
FIG. 4 is a flow chart to assist in the explanation of a method for detecting a fault in an in-wheel driving system of a vehicle in accordance with an embodiment of the present disclosure.

FIG. 4 is a flow chart to assist in the explanation of a method for detecting a fault in an in-wheel driving system of a vehicle in accordance with an embodiment of the present disclosure.

Referring to FIG. 4, the control unit 130 drives the in-wheel motor (or motor) 110 by applying inverter current (S101).

After driving the in-wheel motor 110, the control unit 130 senses the rpm of the motor 110 (that is, an input rpm to the first stage speed reduction part G1) through the first sensor part 121 (S102).

For example, the rpm of the motor 110 (that is, the input rpm to the first stage speed reduction part G1) may be sensed through a motor resolver (not shown).

Also, the control unit 130 senses the rpm (that is, the first output rpm) of the first stage speed reduction part G1 through the second sensor part 122 (S103).

For example, the rpm (that is, the first output rpm) of the first stage speed reduction part G1 may be sensed through an encoder (not shown).

If the rpm of the motor 110 (that is, the input rpm to the first stage speed reduction part G1) and the rpm (that is, the first output rpm) of the first stage speed reduction part G1 are sensed as described above, the control unit 130 calculates the ratio of the input rpm and the first output rpm (S104).

For reference, when assuming that the control unit 130 already knows the speed reduction gear ratios between the motor 110 and the first stage speed reduction part G1 and between the first stage speed reduction part G1 and the second stage speed reduction part G2, the normal rpms (or reference rpms) of the first stage speed reduction part G1 and the second stage speed reduction part G2 corresponding to the rpm of the motor 110 may be calculated.

Therefore, the control unit 130 determines whether the calculated rpm ratio (e.g.: the ratio of the input rpm/the first output rpm) is within an allowable range (an rpm range in consideration of errors of the sensor parts 121 and 122 with respect to the reference rpm) (S105).

In the case where it is determined at the step S105 that the calculated rpm ratio deviates from the allowable range (N of the step S105), the control unit 130 outputs a system warning through the warning output part 140 (S107). In the case where it is determined at the step S105 that the calculated rpm ratio does not deviate from the allowable range (Y of the step S105), the control unit 130 normally drives the in-wheel motor 110 (S106).

FIG. 4 explains a fault detecting method in the case where one speed reduction means is provided to the in-wheel driving system in accordance with the present embodiment, and FIG. 5 explains a fault detecting method in the case where two speed reduction means are provided to the in-wheel driving system in accordance with the present embodiment.

FIG. 5 is a flow chart to assist in the explanation of a method for detecting a fault in an in-wheel driving system of a vehicle in accordance with an embodiment of the present disclosure.

Referring to FIG. 5, the control unit 130 drives the in-wheel motor (or motor) 110 by applying inverter current (S201).

After driving the in-wheel motor 110, the control unit 130 senses the rpm of the motor 110 (that is, an input rpm to the first stage speed reduction part G1) through the first sensor part 121 (S202).

For example, the rpm of the motor 110 (that is, the input rpm to the first stage speed reduction part G1) may be sensed through a motor resolver (not shown).

Also, the control unit 130 senses the rpm (that is, the first output rpm) of the first stage speed reduction part G1 through the second sensor part 122 (S203).

For example, the rpm (that is, the first output rpm) of the first stage speed reduction part G1 may be sensed through an encoder (not shown).

If the rpm of the motor 110 (that is, the input rpm to the first stage speed reduction part G1) and the rpm (that is, the first output rpm) of the first stage speed reduction part G1 are sensed as described above, the control unit 130 calculates the ratio of the input rpm and the first output rpm (S204).

For reference, when assuming that the control unit 130 already knows the speed reduction gear ratios between the motor 110 and the first stage speed reduction part G1 and between the first stage speed reduction part G1 and the second stage speed reduction part G2, the normal rpms (or reference rpms) of the first stage speed reduction part G1 and the second stage speed reduction part G2 corresponding to the rpm of the motor 110 may be calculated.

Therefore, the control unit 130 determines whether the calculated rpm ratio (e.g.: the ratio of the input rpm/the first output rpm) is within an allowable range (an rpm range in consideration of errors of the sensor parts 121 and 122 with respect to the reference rpm) (S205).

In the case where it is determined at the step S205 that the calculated rpm ratio deviates from the allowable range (N of the step S205), the control unit 130 outputs a system warning through the warning output part 140 (S210).

In the case where it is determined at the step S205 that the calculated rpm ratio does not deviate from the allowable range (Y of the step S205), the control unit 130 senses the rpm (that is, the second output rpm) of the second stage speed reduction part G2 through the third sensor part 123 (S206).

For example, the rpm (that is, the second output rpm) of the second stage speed reduction part G2 may be sensed through a wheel speed sensor (not shown).

It is to be noted that the input rpm, the first output rpm and the second output rpm do not need to be detected necessarily using the sensors exemplified above, and may be detected by using at least any one among a wheel speed sensor, an encoder, a resolver and an angle sensor or by using an rpm sensing sensor of another embodiment.

If the rpm (that is, the second output rpm) of the second stage speed reduction part G2 is sensed as described above, the control unit 130 calculates the ratio of the input rpm and the second output rpm and the ratio of the first output rpm and the second output rpm (S207).

The control unit 130 determines whether the calculated rpm ratios (e.g.: the ratio of the input rpm/the second output rpm and the ratio of the first output rpm/the second output rpm) are within allowable ranges (rpm ranges in consideration of errors of the sensor parts 121, 122 and 123 with respect to the reference rpms) (S208).

In the case where it is determined at the step S208 that the calculated rpm ratios deviate from the allowable ranges (N of the step S208), the control unit 130 outputs a system warning through the warning output part 140 (S210). In the case where it is determined at the step S208 that the calculated rpm ratios do not deviate from the allowable ranges (Y of the step S208), the control unit 130 normally drives the in-wheel motor 110 (S209).

The method for detecting a fault in an in-wheel driving system of a vehicle in accordance with the present embodiment may be carried out while the vehicle runs, or may be carried out in a test mode before the vehicle runs. In the case where a fault is detected in the test mode, when a driver wants to drive the vehicle, the control unit 130 may control the in-wheel motor 110 not to be driven.

As is apparent from the above descriptions, in the embodiment of the present disclosure, by detecting a fault or a damage likely to occur in a driving force transfer element of an in-wheel motor of an in-wheel driving system applied to a vehicle and outputting a warning, it is possible for a driver to actively take a necessary action to prevent the occurrence of an accident.

Although preferred embodiments of the invention have been disclosed for illustrative purposes, those skilled in the art will appreciate that various modifications, additions and substitutions are possible, without departing from the scope and spirit of the invention as defined in the accompanying claims. Therefore, the true technical scope of the invention should be defined by the claims.

What is claimed is:

1. An apparatus for detecting a fault in an in-wheel driving system of a vehicle, comprising:
    an in-wheel motor;
    a speed reduction mechanism coupled to the in-wheel motor through a gear and configured to transfer a rotation force of the in-wheel motor to a wheel;
    a sensor configured to sense rotational speeds (rpms) of the in-wheel motor and the speed reduction mechanism; and
    a controller configured to calculate a rpm ratio between the in-wheel motor and the speed reduction mechanism by using the rpms sensed through the sensor and determining whether a damage or a fault has occurred in the speed reduction mechanism based on the calculated rpm ratio,
    wherein:
    the speed reduction mechanism comprises:
        a first stage speed reduction mechanism configured to primarily reduce rotation of the in-wheel motor to a predetermined speed reduction gear ratio; and
        a second stage speed reduction mechanism configured to secondarily reduce rotation of the first stage speed reduction mechanism to a predetermined speed reduction gear ratio;
    the sensor comprises:
        a first sensor configured to detect the rpm of the in-wheel motor as an input rpm to the first stage speed reduction mechanism;
        a second sensor configured to detect a rpm of the first stage speed reduction mechanism as a first output rpm; and
        a third sensor configured to detect a rpm of the second stage speed reduction mechanism as a second output rpm;
    the controller is configured to calculate, based on the rpms detected by the first, second, and third sensors, a first ratio of the input rpm and the first output rpm, a second ratio of the input rpm and the second output rpm, and a third ratio of the first output rpm and the second output rpm;
    the controller is configured to determine a damage or a fault of the speed reduction mechanism according to whether the calculated first, second, and third ratios are respectively within allowable ranges;
    the controller is configured to determine a state of the in-wheel driving system in real time or cyclically while the vehicle runs or in a test mode before the vehicle runs; and
    when it is determined that a damage or a fault has occurred, the controller controls the in-wheel motor not to be driven.

2. The apparatus according to claim 1, wherein the sensor comprises at least one from a group consisting of: a wheel speed sensor, an encoder, a resolver, and an angle sensor.

3. The apparatus according to claim 1, wherein, in order to determine whether a damage or a fault has occurred in the speed reduction mechanism, the controller is configured to calculate reference rpms based on already known speed reduction gear ratios between the in-wheel motor, the first stage speed reduction mechanism, and the second stage speed reduction mechanism, and sets the allowable ranges in consideration of errors of the first, second, and third sensors with respect to the reference rpms.

4. The apparatus according to claim 1, further comprising a warning output part configured to warn that an abnormality has occurred in the in-wheel driving system, through AVN (audio, video, navigation) in the vehicle,
    wherein, when a damage or a fault has occurred in the speed reduction mechanism, the warning output part warns that an abnormality has occurred in the in-wheel driving system according to control of the controller.

5. A method for detecting a fault in an in-wheel driving system of a vehicle, the in-wheel driving system comprising a speed reduction mechanism coupled to an in-wheel motor through a gear and configured to transfer a rotation force of the in-wheel motor to a wheel, the method comprising:
    sensing rpms of the in-wheel motor and the speed reduction mechanism by using first, second, and third sensors controlled by a controller;
    calculating predetermined rpm ratios between the in-wheel motor and the speed reduction mechanism by using the rpms sensed by the first, second, and third sensors;
    determining, by the controller, whether a damage or a fault has occurred between the in-wheel motor and the speed reduction mechanism based on the calculated predetermined rpm ratios; and
    controlling the in-wheel motor not to be driven, by the controller, in the case where it is determined that a damage or a fault has occurred in the determining whether a damage or a fault has occurred between the in-wheel motor and the speed reduction mechanism,
    wherein:
    the speed reduction mechanism comprises:
        a first stage speed reduction mechanism configured to primarily reduce rotation of the in-wheel motor to a predetermined speed reduction gear ratio; and
        a second stage speed reduction mechanism configured to secondarily reduce rotation of the first stage speed reduction mechanism to a predetermined speed reduction gear ratio;
    in the sensing of the rpms of the in-wheel motor and the speed reduction mechanism, the controller detects the rpm of the in-wheel motor as an input rpm to the first stage speed reduction mechanism, detects a rpm of the first stage speed reduction mechanism as a first output rpm, and detects a rpm of the second stage speed reduction mechanism as a second output rpm;
    in the calculating of the predetermined rpm ratios between the in-wheel motor and the speed reduction mechanism, the controller calculates, based on the rpms detected by the first, second, and third sensors, a ratio of the input rpm and the first output rpm, a ratio of the input rpm and the second output rpm, and a ratio of the first output rpm and the second output rpm; and in the determining of whether a damage or a fault has occurred between the in-wheel motor and the speed reduction mechanism, based on the calculated predetermined rpm ratios, the controller calculates reference rpms based on already known speed reduction gear ratios between the in-wheel motor and the speed reduction mechanism, sets allowable ranges in consideration of errors of the first, second, and third sensors with respect to the reference rpms, and determines whether a damage or a fault has occurred between the in-wheel motor and the speed reduction mechanism according to whether the respective calculated rpm ratios are respectively within the allowable ranges.

* * * * *